FIG. 1

Feb. 23, 1943.   H. C. SIMMONS   2,312,270
BLADE MAKING AND RESHARPENING MACHINE
Filed Aug. 5, 1940   4 Sheets-Sheet 4

H.C. SIMMONS   Inventor
By Merrill M. Blackburn
Attorney

Patented Feb. 23, 1943

2,312,270

UNITED STATES PATENT OFFICE 2,312,270

BLADE MAKING AND RESHARPENING MACHINE

Haryl C. Simmons, Davenport, Iowa

Application August 5, 1940, Serial No. 351,499

16 Claims. (Cl. 51—33)

The present invention relates to machines for making or re-sharpening slicing machine blades, whether of the reciprocating type or the band saw type.

Among the objects of this invention are to provide improved means for holding a blade in grinding position; to provide improved indexing mechanism for a machine of the character indicated; to provide, in a machine for the purpose indicated, simplified means for changing the machine from a setting for the grinding of one size of scallop to a setting for the grinding of a different size of scallop; to provide a machine of the type indicated by means of which the grinding of blades is speeded up, whereby to increase the production of blades during any given period of time; to improve generally upon machines of the type mentioned; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

The machine constituting the subject matter of this invention is to be distinguished from such as have a drum around which the blade is bent to be held against a grinding wheel to be ground. It is of the straight line type, represented by the patent to Charles H. Kasch, No. 2,203,530. However, this machine has to be manually indexed for the grinding of the individual scallops, instead of being automatically indexed.

Stated briefly, this machine has a base from which rises a standard upon which is supported a motor for operating a scallop grinding wheel. Also supported by the base and standard is a frame member which carries the grinding wheel and is provided with vertical pivots, making it possible to oscillate the wheel about a vertical axis. Carried by the base is a blade supporting and adjusting mechanism whereby blades are supported in a position adjacent and in front of a grinding wheel by which the grinding is to be done. The operation of the mechanism will be given hereinafter.

In the drawings annexed hereto and forming a part hereof—

Fig. 7 represents a plan view of the blade clamping and indexing mechanism of one form of this invention;

Fig. 8 represents a vertical section of the structure shown in Fig. 7, taken along the plane indicated by the line 8—8 of that figure;

Fig. 9 represents an elevation of the structure shown in Fig. 7, as indicated by the arrows 9—9 of that figure;

Fig. 11 represents a fragmentary horizontal section of a part of the structure shown in Fig. 8, taken along the line 11—11 of that figure, the locking plunger being shown in locking position, while in Fig. 12 these parts are shown in released position.

For a more complete description of this invention, reference will now be made in greater detail to the annexed drawings. In general, this machine comprises a supporting base 1, a supporting standard 2, a head 3 thereabove and oscillatable about a vertical axis, a motor 4, and blade holding and adjusting mechanism 5. The standard 2 has a base 6, provided with a dovetailed connection with the support 1, a gib being provided to furnish replaceable means for taking up any wear due to use of the machine. One or more set screws are turned in against the gib to hold it in place and eliminate undue looseness so that the parts will slide in a true, straight direction. A slot is formed in the base 6 for the reception of bolt 8. This construction permits the sliding of the base 6 on the support 1, adjustment being made by adjusting the bolt 10, shown most clearly in Figs. 2 and 3. The means for holding the bolt 10 against longitudinal movement relatively to the base 1 is shown clearly in the drawings.

In this description and the appended claims, the parts 3, 15, 17, 19, 24, 26, 27, 29, and other parts moving therewith, are, for convenience, referred to as a grinding head.

The motor 4 is mounted upon and secured to the table 11, pivoted at 12 to the head 3 and is adjusted by means of the bolt 13 to take up any slack in the belt 14, connecting the belt pulleys 15 and 16. The grinding wheel 17 is mounted on the same shaft as the belt pulley 15. Therefore, when the motor is operating, it drives the pulley 15, secured to the wheel shaft 18, and this drives the grinding wheel. A double yoke member 19 is pivoted on the pivot member 20 (see Figs. 1 and 2), and this member 19 has the shaft 18 passed therethrough. A bolt 21 presses against the yoke member 19 to swing the wheel 17 toward the work to be ground, whether this be fresh stock which is to be converted into a new blade or whether it be an old blade that is being reground. The spring 22 acts against the force of the bolt 21 and holds member 19 against the end of the bolt so that the grinding will always be to the same depth. The radius of the arc through which the edge of the grinding wheel 17 oscillates, when grinding, determines the size of the scallop cut in the stock, though this is not the sole determining factor, as will appear hereinafter.

A spindle 24 is pinned in the upper arm 25 of the frame 26. A laterally extending lug 27 constitutes a part of the head 3 and has a hole therein for the reception of the spindle 24, the two being pinned together by a pin 28, shown most clearly in Fig. 1. The spindle 24 extends through a ring 29 and the upper arm 30 of the post or standard 2. The ring 29 is held in desired position on the spindle 24 by any suitable set screw, indicated in the drawings by the numeral 31. The spindle 24 and arm 25 are pinned or otherwise fastened together, as shown clearly in Figs. 1 and 2. From the foregoing, it will be apparent that the head 3, spindle 24, ring 29, and frame 26 will oscillate together as the handle 32 is moved back and forth during operation of the machine.

Arranged opposite the spindle 24 is a spindle 33 which fits closely in an opening in the boss 34 on the bottom of the frame 26 and is pinned thereto. Therefore, as the frame 26 is oscillated, the spindles 24 and 33 constitute pivot members which serve as an axis about which the frame may oscillate. It is obvious from Fig. 1 that the axial line of spindles 24 and 33 passes substantially through the central plane of the grinding wheel 17. As a matter of fact, the axis of these two spindles should lie in this plane, in order that perfect grinding may result. If the axis of the shaft 18 intersects the axis of the spindles 24 and 33, then the radius of the arc through which the edge of the grinding wheel moves, when being oscillated, is the radius of the grinding wheel itself.

In this machine, there are three adjustments connected with the grinding wheel which it is necessary to make, first, to compensate for reduction in diameter of the wheel resulting from operation of the machine, second, to change the depth of scallops, and, third, to change the pitch of blade, that is, the distance between points of the blade. Compensation for decrease in diameter of the wheel by reason of wear thereof is accomplished by use of the screw 21 which can be utilized to swing the wheel 17 toward the work so as to keep a uniform distance between the grinding face of the wheel and the axis of oscillation of the head, extending axially through the shafts 24 and 33. In this adjustment, no use is made of the screws 9 and 10 as the positions of the supports 6 and 36 must remain constant except when changing the pitch of the blade. The length of the scallop, or pitch of the blade, should not be confused with the depth of the scallop. This latter can be varied by adjusting the height of the grinding head with relation to the standard 2. This is accomplished in the structure shown by loosening the set screw 31, adjusting the grinding head the amount desired, moving the collar 29 into engagement with the arm 30, and again tightening the set screw 31. Other structures than that shown for accomplishing the same end are possible. Adjustment of pitch of the blade is accomplished by use of the screw 10 by means of which the grinding head can be moved toward or away from the work. The same adjustment could be made by use of the screw 9.

In the first of the three adjustments stated above, it is necessary to use the screw 21, while in the other two, it may be necessary to use it in event the grinding wheel does not have the proper contact with the blade stock after the vertical or horizontal adjustment of the grinding head has been made.

A support 36, comparable to the support 6, carries the work support and the indexing mechanism. In the drawings, I have shown both the support 6 and the support 36 as being slidable with relation to the base 1. This is optional as either one may be fixed and the other one slidable, or both may be slidable, as shown. As the distance of the axis of the axle 18 from the blade material is changed to compensate for wear of the grinding wheel, it is unnecessary to vary the relative positions of the supports 6 and 36. However, if the radius of oscillation of the grinding wheel is decreased by backing up the screw 21, then, necessarily, the wheel is moved away from the blade material and the grinding wheel will not cut a scallop of the proper length as the handle 32 is oscillated, because the grinding wheel will not be in proper contact with the blade material. To overcome this, it is necessary to bring the elements 6 and 36 closer together. It is immaterial which of the units 6 and 36 is moved, but one should be moved toward the other so that the desired grinding will be effected. As stated above, this adjustment is for the purpose of changing the pitch. Normally, it is necessary to use only one of screws 9 and 10 when changing from one pitch to another, although it may at times be desirable to have them both capable of being adjusted. I prefer that the element 6 be the movable one if only one is to be moved.

Bread slicing machine blades are provided with scallops of varying lengths, some of which lengths are five-sixteenths inch, three-eighths inch, and one-half inch. In order to get these different length scallops, it is necessary to change the radius of the arc of grind. This is referred to in the preceding paragraph. This radius is the distance from the axial line through the spindles 24 and 33, about which the grinding head oscillates, to the surface of the grinding wheel 17 at its point of contact with the blade material. If this distance is increased, then the length of the scallop is increased. Conversely, if the distance is decreased, then the length of the scallop is decreased. Swinging the parts 17 and 19 about the pin 20 does not necessarily and of itself change the radius of grind, that is, the radius of the arc of oscillation. This motion of the parts 17 and 19 may be accomplished, in order to keep the grinding face in contact with the material being ground, by adjusting the screw 21. If this is not done occasionally as the machine is used, the wheel 17 is worn away and does not contact sufficiently with the blade material. Therefore, it is necessary to turn inwardly the screw 21 from time to time as the stone is worn away in order to compensate for wear.

The radius of the arc of grind, for a five-sixteenths inch scallop, is one and twenty-one sixty-fourths inches; for a three-eighths inch scallop, it is one and nineteen thirty-seconds inches; and for a one-half inch scallop, it is two and one-eighth inches. Furthermore, if one should want a three-fourths inch scallop, the radius would be three and three-sixteenths inches. These are mere typical dimensions which are given to enable the reader to appreciate the fact that this machine is intended to be a universal machine for the grinding of blades having very short or very long scallops or any length between. Of course it is necessary that the rack 53 have, in each instance, teeth which will correspond to, although they will not be equal to, the length of the scallop so that when the blade is shifted longitudinally for the grinding of the scallops, the locking mechanism will function properly to insure central positioning of the blade scallop with relation to the position of the grinding wheel.

It is clear that, if one has been grinding blades with three-eighths inch scallops and desires to shift to half inch scallops, it is necessary to lengthen the radius of the arc of grind. In order to do this, it is necessary to separate the axial line through the spindles 24 and 33 from the blade material 66. This can be accomplished by moving either base 6 or base 36 away from the other a proper distance. Of course this removes the stone 17 from the blade material, and it is then necessary to swing the parts 17 and 19 about the axis of the spindle 20 by using the screw 21. When the stone 17 properly contacts the blade material, a scallop of the desired length will be ground, provided a rack 53 having teeth of proper dimensions has been substituted for the rack previously used.

Conversely, if one wishes to shorten the scallops, it is necessary to shorten the radius of the arc of grind, and this cannot be done without first backing up the screw 21 to remove the stone 17 from the blade material before it is attempted to make the bases 6 and 36 move any closer together. When the screw 21 has been backed up, the screw 10 may be turned to carry the base 6 toward the base 36 until a proper position has been reached so that the radius of the arc of grind will have the necessary length. The screw 21 may then be turned in to move the stone 17 in, the same as if it had been worn away by use until it did not have the proper contact with the blade material. When proper contact is secured, then the regular grinding may be proceeded with.

Rising from the top of the element 36 is a boss 37 having a vertical substantially central opening therein for the reception of an axle 38, upon which is mounted a carrier member 39. Also rising from the support 36 is a bracket 40, this bracket and the boss 37 being connected by webs 41 intended to give rigidity to the structure. An arm 42 projects outwardly from the support 39 in a direction generally opposite from the support or bracket 40. This arm then projects upwardly and has a hole therethrough for the reception of a plunger 43 provided with a handle for operation. A spring 44 surrounds the plunger 43, bearing, at one end, against the upwardly extending arm and, at its other end, against the head 45 which constitutes the pawl of a pawl and ratchet mechanism. A disc 46, provided around its edge with ratchet teeth, constitutes the second member of this pawl and ratchet assembly. This disc is keyed to the shaft or axle 38, as shown clearly in Fig. 2, and therefore causes rotation of this shaft when member 39 is rotated to the left by rotation of the handle 47, extending outwardly from the upright 48. When the handle 47 is moved in the opposite direction, the pawl rides over the teeth of ratchet 46. The upright 48 has an arm 49 extending substantially horizontally and provided with an opening in alignment with the opening in the member 39. These two openings receive the shaft 38 and therefore furnish a rigid operating connection for the shaft 38 and the members 39, 48, and 49.

A post 50 rises from the support 36 and furnishes a fixed lateral support for the upper portion of the shaft 38. It is apparent that, as the handle 47 is moved to the left by a person standing in front of the machine, the pawl 45 will ride over the notches in the ratchet wheel 46 until it engages the shield 51 which will then lift it away from the ratchet wheel and hold it out of contact therewith until right hand motion of the handle 47 carries the pawl 45 past the edge 56 of the guard 51. The pawl will then engage a notch of the ratchet 46 and this will transmit rotary motion to the shaft 38 which will, in turn, transmit such motion to the gear 52 which is keyed to the shaft 38. This gear is in mesh with a rack 53, removably secured to the bar 54 by bolts 53a, the bar having dove-tailed connection with the support 40, as shown clearly in Fig. 2. Rotary motion of the gear 52 causes longitudinal motion of rack 53 and bar 54, causing them to move toward the left to position the blade material in proper location for the grinding of the scallops, one at a time.

The teeth of the rack 53 are made of a certain width and pitch so that they will cooperate with the teeth of the gear 52, but, in order to adapt the machine to the cutting of scallops of different lengths, the bars 60, having teeth 60a of different spacings, are included in the assembly comprising the elements 53, 54, and 60. Bolts 54a holding the bar 54 in place on the upright 40 may be removed, and it is then possible to slide the assembly 53, 54, 60 endwise to disconnect the dovetail connection. All spacing assemblies comprising the parts 53, 54, and 60 have identical parts 53 and 54 but the indexing bars 60 have their teeth spaced different distances apart, center to center, though the width of the spaces between the teeth 60a remains constant. Bolts 53a pass through parts 53 and 60 into bars 54 and hold these parts in assembled relation.

When the handle 47 is moved toward the right, the pawl 45, which is held out of engagement with the teeth of the ratchet 46 until it passes the edge 56 of the shield 51, does not begin to move the ratchet 46 until it comes into engagement with the teeth. An arm 57, carrying an indicating finger 58, is connected to the shield 51 and may be used to move this shield to desired location, the finger 58 indicating on the scale 59 the length of spacing between points of the blades which it is intended to form or re-grind. A series of holes are formed in the arm 57 and the post 59a, on which the scale 59 is located, for the reception of a pin 57a used in fixing the location of the shield 51 so that it will not be inadvertently moved from one position to another.

Ordinarily, the longest scallops are one-half inch and the shortest one-fourth inch. Therefore, I have shown the scale 59 as having these limits. The space between the edges 55 and 56 is sufficient to permit the maximum spacing of one-half inch when the finger 58 is set for that amount. When the pointer or finger 58 is set for one-half inch on the scale 59, the edge 56 is farther to the left than shown in Fig. 4, and the pawl therefore engages the teeth of ratchet 46 farther to the left, and this results in the ratchet being turned a greater distance by the swinging of handle 47. This is limited by the end of plate 64, forming a part of plunger 64a, engaging the face of wall 40, as is clear from Figs. 2 and 3.

The slide 62 is actuated by a finger 63 rigidly connected with the handle 47, the handle operating, when turned to the right, to push the slide 62 forwardly and remove the positioning member 61 (see Fig. 2) from the notches between the teeth 60a. At the same time, the plunger 64a is moved forwardly, the forward end of plate 64 engaging the wall 40, as stated above. This plunger has mounted on its forward end a clamping jaw 65, the upper part of which is divided into a pair of members separated from each other but united into a common body below. When the handle 47 is moved to the left, the finger 63 draws the plunger back, pulling the clamping head 65 against the blade material 66. When this takes place, the positioning member 61, carried by the slide 62, enters the space between a pair of teeth 60a (see Fig. 1) and indexes the spacing assembly very accurately, due to the wedging action of member 61 with relation to teeth 60a. The rough indexing is done by the gear 52 and the pawl 45.

Figures 7, 8, 9, 11, 12:
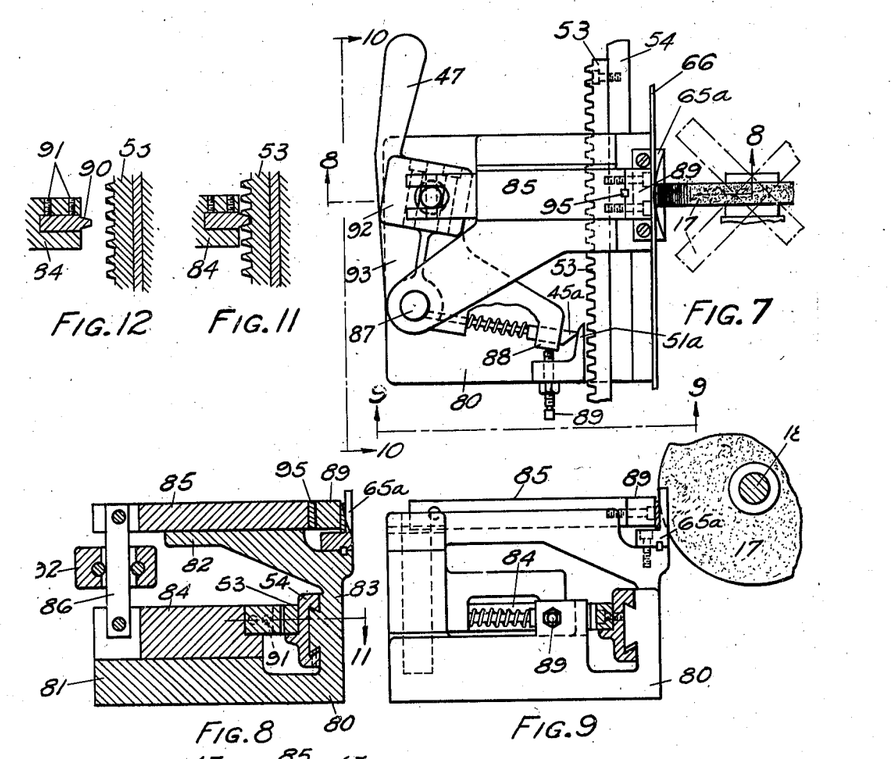
Figure 10:
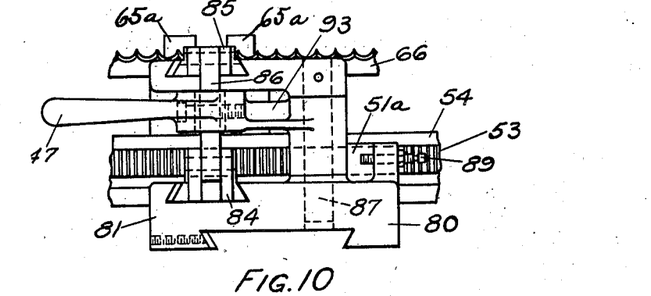
Fig. 10 represents an elevation of the structure shown in Fig. 7, taken from the left side of that figure.

When the head 65 is pulled into clamping position, the handle 32, which is in a position such that the grinding wheel 17 occupies one of the dot-and-dash positions shown in Fig. 7, is pulled and pushed in reverse directions to cause the edge of the wheel to swing twice across the blade, as is obvious from Fig. 7, grinding a scallop therein. From Fig. 9 it is apparent that the upper portion of the material will be ground more than the lower portion, and the scallops will therefore be beveled. It is also obvious that, when one face of the blade material has been ground, the blade may be reversed and the opposite face ground to form scallops, as shown in Fig. 10, each scallop being beveled on both faces.

Figure 1:
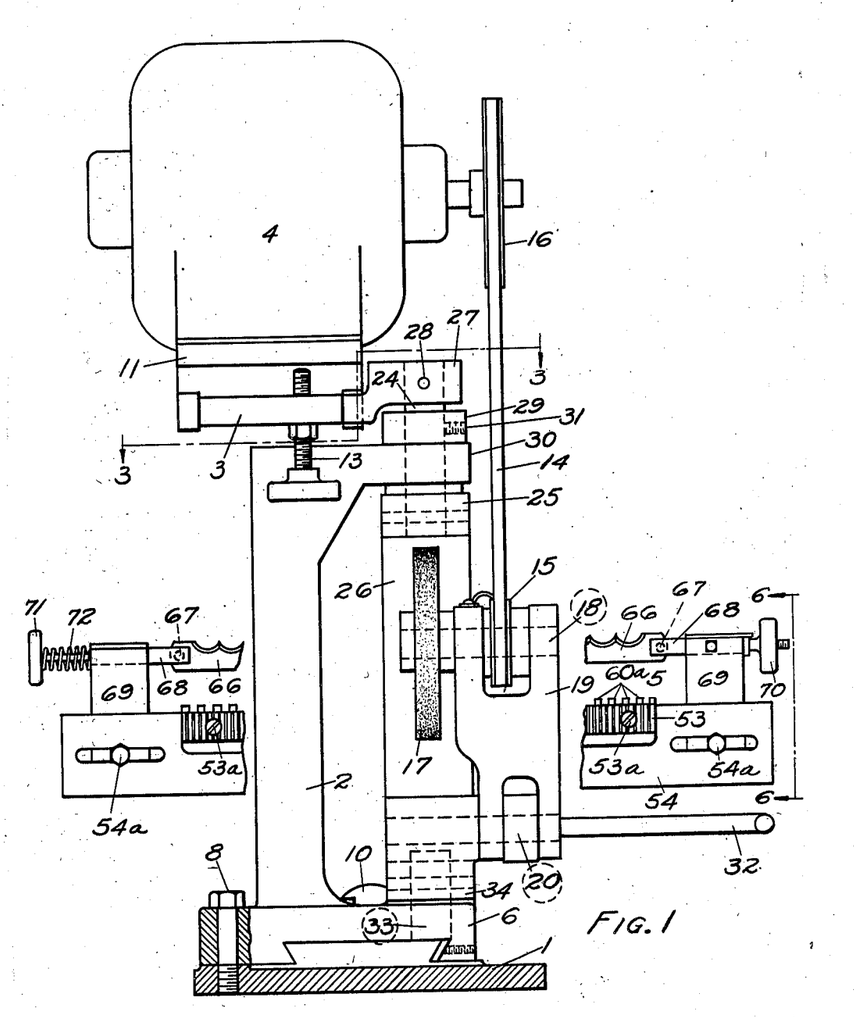
Fig. 1 represents a vertical sectional elevation substantially along the broken plane indicated by the line 1—1, Fig. 2.
Figures 3, 4:
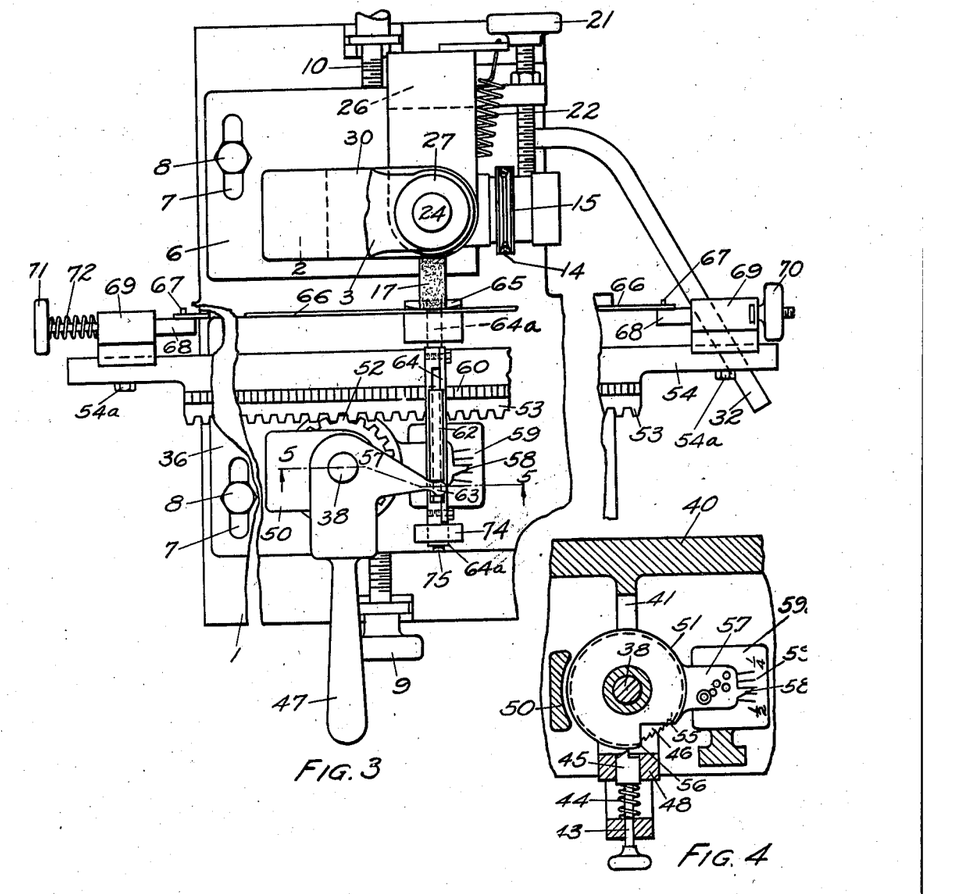
Fig. 3 represents a plan section taken substantially along the broken plane indicated by the line 3—3, Fig. 1.
Fig. 4 represents a horizontal section taken substantially along the broken plane indicated by the line 4—4, Fig. 2.

Most blades have openings formed in the ends thereof whereby they are secured in place in a slicing machine. These openings are utilized in mounting the blades in this machine for grinding, the openings receiving the pins 67, as seen in Figs. 1 and 3. The pins 67 are carried by adjustable slides 68, mounted in and slidable through blocks 69 held in place on bars 54 by bolts 54a. The right hand slide 68 has an end reduced and screw-threaded for cooperation with a nut 70. By means of this adjustment, the blade can be accurately positioned so that, in re-grinding, the position of the blade points will not be changed. A knob 71 on the left hand slide furnishes an abutment for one end of the spring 72, the other end of which pushes against the block 69. This makes it possible to have the blades under a substantially uniform tension when grinding them.

Figures 2, 5, 6:
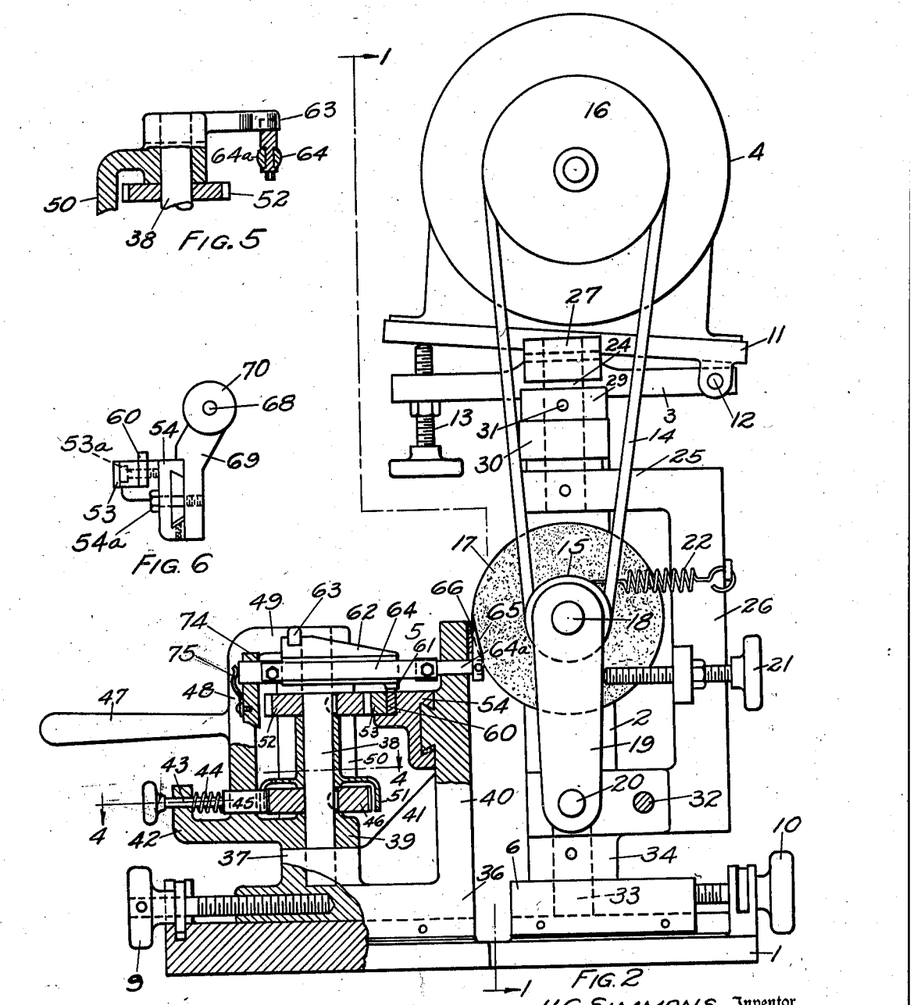
Fig. 2 represents a side elevation, partly in section, of the structure shown in Fig. 1.
Fig. 5 represents a fragmentary vertical section taken substantially along the broken plane indicated by the line 5—5, Fig. 3.
Fig. 6 represents a partial elevation, looking at the right side of the machine, as indicated by the line 6—6, Fig. 1.

In Figs. 2 and 3 there is shown a post 74 through which the plunger 64a extends and by which it is guided in its reciprocation. On this post is a spring 75 which presses against the end of the plunger 64a to force it forwardly when it is free to move. This results in moving the jaw 65 out of engagement with the blade material 66, resulting in release thereof. On the contrary, when the handle 47 is moved to the left, finger 63 retracts slide 62 causing it to retract plunger 64a, the spring 75 yielding to permit this motion which is necessary in order that the jaw 65 may clamp the blade material against the wall 40. When the positioning member 61 is pulled in between a pair of teeth 60a to finish indexing the blade material, the jaw 65 is also pulled against the blade material to clamp it in indexed position. The bar 54 and associated parts may be made short for the grinding of ordinary length slicing blades or considerably longer for use in grinding or sharpening either short blades or band blades. When these parts are made long, it is advisable to have the part 40 elongated so that an elongated support is provided for the bar 54 to hold the same accurately positioned throughout its sliding motion. This is indicated somewhat in Fig. 3.

Operation

While the operation of the machine has been detailed in connection with the foregoing description of the machine, it will now be summarized, so far as concerns the form described above.

To start with, the operator sees to it that the handle 32 is pushed away from him as far as it will go so that the grinding wheel will not interfere with the insertion of blade material into the machine. Then, with the motor running, he attaches the blade to one of the pins 67. After this, the head 71 is pushed to the right to compress the spring 72 and allow the second end of the blade to be attached to the other pin 67. It is now necessary to see that the carriage, comprising elements 53, 54, 60 and 67—72 is far enough to the right to get the approximately proper location for the first scallop at the left end of the blade. This must be done with the handle 47 turned to the right so as to remove member 61 from between the teeth 60a. The handle 47 is now turned to the left to index the blade, lock the carriage in place by means of the positioning member 61, and clamp the blade in place by drawing the jaw 65 against the blade. The handle 32 is now pulled to turn the grinding unit, or grinding head, comprising the motor, pulleys, belt, grinding wheel, etc., so as to swing the grinding wheel across the face of the blade, lengthwise thereof. When the wheel has cleared the blade, the direction of swing is reversed and the handle 32 pushed until it stops. Next, the handle 47 is moved to the right to space the blade to the left, the handle being moved until stopped by the end of 64 hitting the face of wall 40. The handle 47 is then swung to the left to complete the indexing and clamping of the blade. The handle is now held in this position for the next operation of the grinding assembly. After the scallops have been ground or sharpened, the blade is reversed and the foregoing procedure is repeated for the second face of the blade.

The structure shown in Figs. 7 to 12 of the drawings is a modification of the indexing and clamping mechanism described above. In this form, the gear 52 is dispensed with, the pawl 45a doing the work of the gear. Also, in this form, the movable jaw 65 is replaced by a fixed jaw 65a.

A support 80, corresponding to support 36, has dove-tailed sliding connection with the base 1, as in the above described construction. This support has bottom and top branches 81 and 82 connected by a connecting wall 83. The bar 54 has dovetailed connection with the wall 83, the bar being slidable thereon to accomplish spacing of the blade. Sliding members 84 and 85 have dovetailed connection with branches 81 and 82, respectively, so that they will be guided in their sliding movements. A link 86 is pivotally connected at its ends to said members 84 and 85 and serves as an equalizer to furnish equal pressure at the forward ends of the members.

The handle 47, pivoted at 87, has an arm 88 which carries the pawl 45a. The swinging motion of the handle in one direction is limited by an adjustable bolt 89. From Fig. 7 it will be seen that the pawl 45a rides up on the guard 51a comparably to the way pawl 45 rides up on the shield or guard 51. When the operator pulls the handle 47 toward himself, the pawl 45a engages a tooth of the rack 53 and shifts it toward the left, thereby positioning the blade for the next cut by the wheel 17. Pulling the handle 47 pulls the link 86 away from rack 53 and jaw 65a, thereby releasing the rack 53 for longitudinal shifting and pulling the clamping member 89, secured to the forward end of slide 85, away from the blade and the fixed jaw 65a, to permit of shifting the blade.

The slide 84 has a positioning and indexing tooth set into a notch therein and secured in place by a pair of screws 91. The end of this tooth is shaped to fit a notch in the bar or rack 53 and it therefore acts to do the fine indexing which is needed for accurate work. In this respect it is comparable to member 61 described above. Figs. 11 and 12 show this member in fully advanced and fully retracted positions, respectively. An enlargement 92, of which the handle 47 is a part, has an eye through which the link extends and in which it may rock when moving the slides 84 and 85. Between the forward end of slide 85 and its removable and replaceable tip 89, there may be a suitable key 95 to insure proper placement of the tip and to assist in holding it in place. As is apparent from Fig. 7, this tip is held in place by a pair of screws. The removable jaw 65a is held in place by a pair of screws, as shown in Fig. 7. These tips are provided for purpose of replacement when worn, more especially when ground away by the wheel 17.

It is of course understood that the specific description of structure set forth herein may be departed from without departing from the spirit of my invention as expressed in the following claims.

Having now described my invention, I claim:

1. In a scallop grinding machine, a supporting base, a standard rising therefrom and adapted to support a grinding wheel, said standard being capable of oscillating movement about a substantially vertical axis, a link pivotally mounted on said standard for oscillation in a substantially vertical plane, a grinding wheel carried by said link and oscillating therewith toward and away from a work piece and with said standard about its said axis, means for oscillating said wheel toward and away from the work piece, a work-clamping support arranged adjacent the wheel to hold the work in position to be ground by the wheel, and means for oscillating the standard and wheel about said substantially vertical axis.

2. In a blade grinder for grinding a scalloped edge, a blade supporting and positioning assembly, a grinding wheel mounted adjacent thereto and cooperating therewith, an assembly for supporting said grinding wheel adjacent the first mentioned assembly, a support for the second mentioned assembly, the second mentioned assembly having a substantially vertical axle connecting it to said support, said second mentioned assembly being oscillatable about the axis of said axle, means connecting the first mentioned assembly and said support for relative adjustment of one toward or away from the other, means for mounting the wheel for adjustment of its axis of rotation toward and from the axis of oscillation of the second mentioned assembly, means for adjusting the axis of rotation of the grinding wheel toward and from the axis of oscillation of the second mentioned assembly, whereby to vary the radius of oscillation of the grinding face of the wheel, adjusting means for effecting the relative adjustment of the first mentioned assembly and the support, means connected with the blade supporting assembly for shifting the blade longitudinally past the grinding wheel, and means connected with the second mentioned assembly for oscillating the wheel about its substantially vertical axis.

3. A blade-grinding machine comprising a supporting unit having an axis about which it may oscillate, a grinding wheel carried by said unit having its mid-plane of rotation approximately coincident with said axis, and supporting means for said wheel having an axis of oscillation substantially perpendicular to said mid-plane, offset from the axis of rotation of said wheel, and supporting the wheel upon the supporting unit for oscillation in the direction of its mid-plane, the wheel, when oscillating about the axis of oscillation of said supporting unit, describing an arc, the radius of which may be varied by shifting the wheel about the offset axis of oscillation of the supporting means for the wheel.

4. A blade-grinding machine comprising a wheel-supporting unit having an axis about which it may oscillate, a grinding wheel supported by said unit and having its mid-plane of rotation approximately coincident with said axis of oscillation, supporting means for said wheel having an axis of oscillation substantially perpendicular to said mid-plane, offset from the axis of rotation of said wheel, and supporting the wheel upon the supporting unit for oscillation in the direction of its mid-plane, the wheel, when oscillating about the axis of oscillation of said supporting unit, describing an arc, the radius of which may be varied by shifting the wheel about the offset axis of oscillation of the supporting means for the wheel, and blade clamping and supporting means adjacent the supporting unit to hold a blade in position to be contacted by the wheel as it oscillates about its axis of oscillation.

5. A blade-grinding machine comprising a wheel-supporting unit having an axis about which it may oscillate, a grinding wheel supported by said unit and having its mid-plane of rotation approximately coincident with said axis of oscillation, supporting means for said wheel having an axis of oscillation substantially perpendicular to said mid-plane, offset from the axis of rotation of said wheel, and supporting the wheel upon the supporting unit for oscillation in the direction of its mid-plane, the wheel, when oscillating about the axis of oscillation of said supporting unit, describing an arc, the radius of which may be varied by shifting the wheel about the offset axis of oscillation of the supporting means for the wheel, blade clamping and supporting means adjacent the supporting unit to hold a blade in position to be contacted by the wheel as it oscillates about its axis of oscillation, and means for manually oscillating the grinding wheel across the face of the blade material being ground.

6. In a machine for the purpose indicated, a longitudinally shiftable blade-supporting means for supporting a blade and shifting it lengthwise, manually oscillatable mechanism for intermittently moving said supporting means and thereby the supported blade, means for indexing the blade-supporting means, and blade-clamping means moving in synchronism with the blade-shifting means to release the blade for shifting movement and to clamp the blade after shifting is completed, in combination with a grinding wheel oscillatable about an axis offset from the plane of the blade material and substantially parallel thereto.

7. Means, in a blade-grinding machine, for supporting blade material to be ground and for shifting it longitudinally in equal predeterminable amounts, comprising a support having a fixed jaw, a second support slidable on the first support and constructed and arranged to hold blade material in definite relation to the fixed jaw, a movable jaw carried by the first support and cooperating with the fixed jaw in clamping the blade material during each grinding operation, and manually oscillatable mechanism on the first support for intermittently moving the second support to move the blade material longitudinally between the jaws definite distances between grinding operations.

8. A structure as defined by claim 7 in which the mechanism for shifting the blade material comprises a rack supporting the blade material, and a pawl for causing actuation of said rack to space the blade material longitudinally thereof predeterminable amounts.

9. A structure as defined by claim 7 in which the mechanism for shifting the blade material comprises a rack supporting the blade material, a gear meshing with said rack, a shaft to which said gear is secured, a ratchet secured to said shaft, a pawl to engage and rotate said ratchet predeterminable amounts, and manual means for actuating said pawl and ratchet to move the rack distances corresponding to the predetermined rotation of said ratchet.

10. Means, in a blade-grinding machine, for supporting blade material to be ground and for shifting it longitudinally in equal predeterminable amounts, comprising a support having a fixed jaw, a second support slidable on the first support and constructed and arranged to hold blade material in definite relation to the fixed jaw, a movable jaw cooperating with the fixed jaw in clamping the blade material during each grinding operation, manually oscillatable mechanism for intermittently moving the blade material longitudinally definite distances between grinding operations, and an indexing and positive securing means for the blade support which comprises a toothed member and a wedging member movable into the space between two teeth of the toothed member.

11. In a blade grinder for forming or re-grinding a scalloped edge on a blade, a blade supporting and positioning assembly, an assembly for supporting a grinding wheel adjacent the first named assembly, adjusting means, including a slideway, for adjusting the grinding wheel assembly toward or away from the blade supporting assembly for adjusting the distance apart of the two assemblies, a substantially vertical axis about which the grinding wheel assembly may be oscillated, manually actuated means for intermittently shifting the blade longitudinally past the grinding wheel, mechanism for clamping a blade in position to be ground, and the blade-shifting means including a pawl and ratchet mechanism operatively connected with the blade-clamping means so that the blade may be unclamped at the time it is shifted and be clamped when not being shifted.

12. A structure as defined by claim 7 in which the blade-shifting mechanism comprises a pawl, a rack cooperating with said pawl to shift blade material longitudinally of itself, said rack being connected to the second support to move it when the rack is moved, a handle for oscillating said pawl to cause movement of the rack, and means to regulate the amount which the rack may be moved by one actuation of the pawl.

13. In a machine for the purpose indicated, a longitudinally shiftable blade-supporting means for supporting a blade and shifting it lengthwise, manually oscillatable mechanism for intermittently moving said supporting means and the supported blade rectilinearly, means for accurately indexing the blade-supporting means, blade-clamping means moving in synchronism with the blade-shifting means to release the blade for shifting movement and to clamp the blade after shifting is completed, and means for causing the blade-holding means to move always in a direction parallel to the initial position of the blade.

14. In a blade-grinding machine, a grinding wheel having a substantially vertical axis of oscillation, a substantially vertical axle supporting said wheel for oscillation about said axis, a base upon which said axle is mounted for oscillation, actuating means whereby the grinding wheel may be oscillated through a substantial angle about said axis, blade-supporting means for supporting in the path of movement of the grinding wheel blade material to be ground, a base upon which the supporting means for the blade material is mounted, a third base upon which the first and second bases are mounted for sliding movement toward or from one another, a fixed jaw against which the blade material may be pressed, a movable jaw for pressing the blade material against the fixed jaw, actuating means movable in one direction to move the clamping jaw out of clamping position and movable in the opposite direction to move it into clamping position whereby the blade material is held rigidly against the fixed jaw, and actuating means for the first and second bases whereby they may be moved independently toward or from one another.

15. A blade-grinding machine comprising a supporting unit and means to support the same, said unit and supporting means having an axle connecting them whereby the supporting unit is enabled to oscillate about an axis of oscillation relatively to the supporting means therefor, a grinding wheel having an axle of rotation and an axle of oscillation other than the first mentioned axle, supporting means for the wheel connecting the two last mentioned axles and enabling the wheel to be oscillated in the direction of its mid-plane whereby to compensate for wear of the wheel, the axis of the first mentioned axle, extended, lying substantially in said mid-plane, the axes of the axle of the supporting unit and the axle of oscillation of the grinding wheel being substantially in the same plane and perpendicular to each other, the grinding face of the wheel oscillating in an arc, centered in the first mentioned axle, and in contact with the blade material, blade-holding means for holding blade material closely adjacent the wheel, and manually oscillatable mechanism which, when oscillated, shifts the blade material, intermittently, past the wheel.

16. In a scallop grinding machine, a supporting base, a slidable base section connected slidably with the first mentioned base, a standard rising from said section for oscillation about a substantially vertical axis, a grinding element, constituting a part of a grinding head, supported by the base and standard, said grinding element being rotatable about an approximately horizontal axis, a work support for supporting, in proximity to the grinding element, work to be ground, pivot means, substantially parallel with the axis of the grinding element, connecting the grinding element with the remainder of the grinding head for oscillation toward and from the work, the slidable base section having the standard and grinding element carried thereby, whereby it is made possible to decrease or increase the distance between the work piece and the axis of oscillation of the grinding head about the substantially vertical axis, adjusting means for increasing or decreasing the distance between the vertical axis and the work support, and means providing adjustment for the grinding element about said pivot means, whereby to compensate for wear of the grinding element.

HARYL C. SIMMONS.